US011363669B2

(12) United States Patent
Abedini et al.

(10) Patent No.: US 11,363,669 B2
(45) Date of Patent: Jun. 14, 2022

(54) CONDITIONAL RELEASE OF SOFT RESOURCES IN AN INTEGRATED ACCESS AND BACKHAUL NETWORK

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Muhammad Nazmul Islam, Littleton, MA (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,370

(22) Filed: Oct. 30, 2019

(65) Prior Publication Data

US 2020/0146099 A1 May 7, 2020

Related U.S. Application Data

(60) Provisional application No. 62/754,426, filed on Nov. 1, 2018.

(51) Int. Cl.
*H04W 56/00* (2009.01)
*H04W 76/36* (2018.01)
(Continued)

(52) U.S. Cl.
CPC .......... *H04W 76/36* (2018.02); *H04L 1/0003* (2013.01); *H04W 72/0446* (2013.01); *H04W 72/0473* (2013.01); *H04W 80/02* (2013.01)

(58) Field of Classification Search
CPC ............ H04W 76/36; H04W 72/0446; H04W 72/0473; H04W 80/02; H04L 1/0003
(Continued)

(56) References Cited

U.S. PATENT DOCUMENTS 10,924,212 B2 2/2021 Cao et al.
2014/0036804 A1 2/2014 Chen et al.
(Continued)

FOREIGN PATENT DOCUMENTS

WO WO-2018048642 A1 3/2018

OTHER PUBLICATIONS

Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination.
(Continued)

*Primary Examiner* — Sai Ming Chan
(74) *Attorney, Agent, or Firm* — Qualcomm Incorporated

(57) ABSTRACT

In some aspects, a node may configure whether a set of soft time resources is to be conditionally released or unconditionally released. The set of soft time resources may be configurable in a schedulable state or a non-schedulable state. The set of soft time resources may be schedulable subject to at most a directionality constraint when unconditionally released and, when conditionally released, being schedulable subject to: the directionality constraint and one or more conditions other than the directionality constraint if the set of soft resources is configured subject to the direc-
(Continued)

tionality constraint, or at least one of the directionality constraint or the one or more conditions other than the directionality constraint if the set of soft resources is not configured subject to the directionality constraint. The node may transmit a configuration that indicates whether the set of soft time resources is conditionally released or unconditionally released in the schedulable state.

52 Claims, 8 Drawing Sheets

(51) Int. Cl.
    *H04W 72/04*    (2009.01)
    *H04W 80/02*    (2009.01)
    *H04L 1/00*    (2006.01)

(58) Field of Classification Search
    USPC .......................................................... 370/329
    See application file for complete search history.

(56) References Cited

U.S. PATENT DOCUMENTS

| | | | |
|---|---|---|---|
| 2016/0344527 A1 | 11/2016 | Blankenship et al. | |
| 2017/0323343 A1 | 11/2017 | Dey et al. | |
| 2018/0302899 A1 | 10/2018 | Aijaz | |
| 2019/0021032 A1 | 1/2019 | Bergstrom et al. | |
| 2019/0141762 A1 | 5/2019 | Novlan et al. | |
| 2019/0150213 A1* | 5/2019 | Kim ................... | H04L 41/0806 370/254 |
| 2019/0349079 A1* | 11/2019 | Novlan .............. | H04B 7/15542 |
| 2020/0084688 A1 | 3/2020 | Mildh et al. | |
| 2020/0100124 A1* | 3/2020 | Hampel ............. | H04B 7/15528 |
| 2020/0145991 A1 | 5/2020 | Abedini et al. | |
| 2020/0145992 A1 | 5/2020 | Abedini et al. | |
| 2020/0145993 A1 | 5/2020 | Abedini et al. | |
| 2021/0195674 A1 | 6/2021 | Park et al. | |

OTHER PUBLICATIONS

Ericsson: "Timing of IAB-node Transmissions," 3GPP DRAFT, 3GPP TSG-RAN WG1 Meeting #94bis, R1-1811449, 3RD Generation Partnership Project (3GPP), Mobile Competence Centre, 650, Route Des Lucioles, F-06921, Sophia-Cedex, France, vol. RAN WG1, No. Chengdu, China; Oct. 8, 2018-Oct. 12, 2018, Sep. 28, 2018 (Sep. 28, 2018), XP051518852, 4 pages, Retrieved from the Internet: URL: http://www.3gpp.org/ftp/tsg%5Fran/WG1% 5FRL1/TSGR1%5F94b/Docs/R1%2D1811449%2Ezip [retrieved on Sep. 28, 2018], 2 Discussion.
Ericsson: "Physical Layer Aspects of IAB," 3GPP DRAFT, 3GPP TSG-RAN WG1 Meeting #94bis, R1-1811512, 3RD Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 28, 2018 (Sep. 28, 2018), XP051518914, 4 pages, Retrieved from the Internet: URL: http://www.3gpp.org/ftp/tsg%5Fran/WG1%5FRL1/ TSGR1%5F94b/Docs/R1%2D1811512%2Ezip [retrieved on Sep. 28, 2018] Observation 4.
International Search Report and Written Opinion—PCT/US2019/ 059224—ISA/EPO—dated Feb. 13, 2020.
Catt: "NR Physical Layer Design for IAB Backhaul Link", 3GPP Draft, 3GPP TSG RAN WG1 Meeting #94bis, R1-1810538_IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018, XP051517946, 7 pages, Retrieved from the Internet: URL: http://www.3gpp.org/ftp/tsg%5Fran/WG1%5FRL1/ TSGR1%5F94b/Docs/R1%2D1810538%2Ezip [retrieved on Sep. 29, 2018] the whole document.

Ericsson: "Updated Summary of 7.2.3.1 Enhancements to Support NR Backhaul links", 3GPP TSG RAN WG1 Meeting #94bis, 3GPP Draft; R1-1812042, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Oct. 12, 2018, XP051519366, Retrieved from the Internet: URL:http://www.3gpp.org/ftp/tsg% 5Fran/WG1%5FRL1/TSGR1%5F94b/Docs/R1%2D1812042% 2Ezip [retrieved on Oct. 12, 2018], pp. 3-4, Vivo, pp. 9-15, 3 Dynamic resource allocation between backhaul and access links, 22 pages.
Intel Corporation: "PHY Enhancements for NR IAB," 3GPP Draft, 3GPP TSG RAN WG1 #94bis, R1-1810770, 3RD Generation Partnership Project (3GPP), Mobile Competence Centre, 650, Route Des Lucioles, F-06921, Sophia-Antipolis Cedex, France, vol. RAN WG1, Oct. 8, 2018-Oct. 12, 2018, Sep. 29, 2018 (Sep. 29, 2018), pp. 1-13, XP051518175, Retrieved from the Internet URL:http://www. 3gpp.org/ftp/tsg%5Fran/WG1%5FRL1/TSGR1%5F94b/Docs/R1% 2D1810770%2Ezip sections 3, 3.1, 3.2, 5, 5.2, 5.3.
NEC: "Discussion on IAB", 3GPP Draft, 3GPP TSG Ran WG1 Meeting #94b, R1-1810806, Discussion on IAB, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518211, 2 pages, Retrieved from the Internet: URL:http://www.3gpp.org/ftp/tsg%5Fran/WG1%5FRL1/ TSGR1%5F94b/Docs/R1%2D1810806%2Ezip [retrieved on Sep. 28, 2018], sections 1, 3.
NEC: "Resource Allocation for NR PUCCH", 3GPP Draft, 3GPP TSG RAN WG1 Meeting 91, R1-1720380 PUCCH_RESOURCE_ ALLOCATION_V3E, 3rd Generation Partnership Project (3GPP), Mobile Competence Centre, 650, Route Des Lucioles, F-06921 Sophia-Antipolis Cedex, France, vol. RAN WG1, No. Reno, Nevada; Nov. 27, 2017-Dec. 1, 2017, Nov. 18, 2017, XP051369943, Retrieved from the Internet: URL:http://www.3gpp.org/ftp/tsg%5Fran/WG1% 5FRL1/TSGR1%5F91/Docs/ [retrieved on Nov. 18, 2017], 8 pages.
Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 17, 2018-Aug. 24, 2018, Aug. 17, 2018 (Aug. 17, 2017), XP051516809, 6 Pages, Retrieved from the Internet: URL: http://www.3gpp.org/ftp/tsg%5Fran/WG1% 5FRL1/TSGR1%5F94/Docs/R1%2D1809444%02Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]- [0002].
Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3rd Generation Partnership Project (3GPP), Mobile Competence Centre, 650, Route Des Lucioles, F-06921 Sophia-Antipolis Cede, vol. RAN WG2, No. Busan, South Korea, May 21, 2018-May 25, 2018, May 20, 2018 (May 20, 2018), XP051444329, 3 Pages, Retrieved from the Internet: URL: http://www.3gpp.org/ftp/Meetings% 5F3GPP%5FSYNC/RAN2/Docs/[retrieved on May 20, 2018], p. 2, figure 2, figures 1, 2, sections 1, 2.
Qualcomm Incorporated: "Resource Allocation and Transmit Diversity for PUCCH", 3GPP Draft, 3GPP TSG RAN WG1 Meeting #90b, R1-1718566 Resource Allocation for PUCCH, 3RD Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341747, 14 pages, Retrieved from the Internet:URL:http://www.3gpp.org/ftp/Meetings_3GPP_SYNC/ RAN1/Docs/, [retrieved on Oct. 8, 2017], figures 1,2, sections 1, 2.
Qualcomm Incorporated: "Resource Allocation for PUCCH," 3GPP Draft, 3GPP TSG RAN WG1 Meeting #91, R1-1720686 Resource Allocation for PUCCH, 3rd Generation Partnership Project (3GPP), Mobile Competence Centre; 650, Route Des Lucioles; F-06921 Sophia-Antipolis Cedex; France, vol. Ran WG1, no Reno, US; Nov. 27, 2017-Dec. 1, 2017, Nov. 18, 2017, XP051370147, 22 pages,

(56) References Cited

OTHER PUBLICATIONS

Retrieved from the Internet: URL: http://www.3gpp.org/ftp/tsg%5Fran/WG1%5FRL1/TSGR1%5F91/Docs/ [retrieved on Nov. 18, 2017].

Qualcomm Incorporated: "Resource Management in IAB Network," 3GPP Draft, 3GPP TSG RAN WG1 Meeting #94bis, R1-1811258, 3RD Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018 , Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3, Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 3 "Conclusion".

Vivo: "Enhancements to Support NR Backhaul Link", 3GPP Draft, 3GPP TSG RAN WG1 Meeting #94bis, R1-1810387, Enhancements to Support NR Backhaul Link-Final, 3RD Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051517796, pp. 1-9, Retrieved from the Internet : URL:http://www.3gpp.org/ftp/tsg%5Fran/WG1%5FRL1/TSGR1%5F94b/Docs/R1%2D1810387%2Ezip [Retrieved on Sep. 29, 2018], sections 2.1.1, 2.2.1, 2.3.1, 2.3.2, 2.5.

MCC Support: "Draft Report of 3GPP TSG RAN WG1 #94bis v0.1.0", 3GPP TSG RAN WG1 Meeting #95, R1-181xxxx, Spokane, USA, Nov. 12-16, 2018, 190 Pages (submission date: Oct. 16, 2018).

MCC Support: "Final Report of 3GPP TSG RAN WG1 #94bis v1.0.0", 3GPP Draft, 3GPP TSG RAN WG1 Meeting #95, R1-1812101, Spokane, USA, Nov. 12-16, 2018, 197 Pages.

* cited by examiner

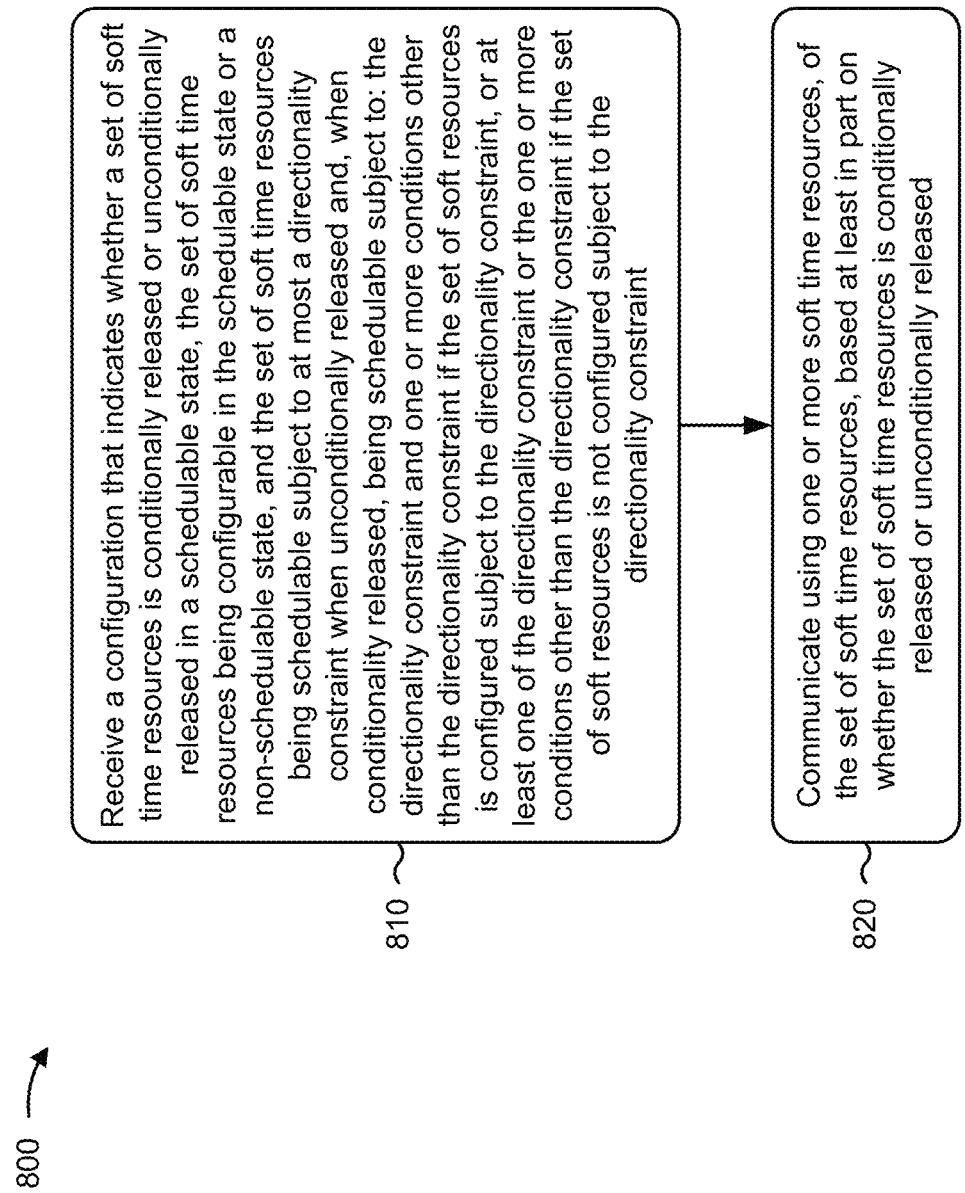

CONDITIONAL RELEASE OF SOFT RESOURCES IN AN INTEGRATED ACCESS AND BACKHAUL NETWORK

CROSS-REFERENCE TO RELATED APPLICATION

This application claims priority to U.S. Provisional Patent Application No. 62/754,426, filed on Nov. 1, 2018, entitled "CONDITIONAL RELEASE OF SOFT RESOURCES IN AN INTEGRATED ACCESS AND BACKHAUL NETWORK," which is hereby expressly incorporated by reference herein.

INTRODUCTION

Aspects of the present disclosure generally relate to wireless communication and to techniques and apparatuses for management of resources in a network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node in an integrated access and backhaul (IAB) network, may include configuring whether a set of soft time resources is to be conditionally released or unconditionally released. The set of soft time resources may be configurable in a schedulable state or a non-schedulable state. The set of soft time resources may be schedulable subject to at most a directionality constraint when unconditionally released. When conditionally released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The method may include transmitting a configuration that indicates whether the set of soft time resources is conditionally released or unconditionally released in the schedulable state.

In some aspects, a method of wireless communication, performed by a node in a IAB network, may include receiving a configuration that indicates whether a set of soft time resources is conditionally released or unconditionally released in a schedulable state. The set of soft time resources may be configurable in the schedulable state or a non-schedulable state. The set of soft time resources may be schedulable subject to at most a directionality constraint when unconditionally released. When conditionality released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The method may include communicating using one or more soft time resources, of the set of soft time resources, based at least in part on whether the set of soft time resources is conditionally released or unconditionally released.

In some aspects, a node in an IAB network may include memory and one or more processors operatively coupled to the memory. The memory and the one or more processors may be configured to configure whether a set of soft time resources is to be conditionally released or unconditionally released. The set of soft time resources may be configurable in a schedulable state or a non-schedulable state. The set of soft time resources may be schedulable subject to at most a directionality constraint when unconditionally released. When conditionally released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The memory and the one or more processors may be configured to transmit a configuration that indicates whether the set of soft time resources is conditionally released or unconditionally released in the schedulable state.

In some aspects, a node in an IAB network may include memory and one or more processors operatively coupled to the memory. The memory and the one or more processors may be configured to receive a configuration that indicates whether a set of soft time resources is conditionally released or unconditionally released in a schedulable state. The set of soft time resources may be configurable in the schedulable state or a non-schedulable state. The set of soft time resources may be schedulable subject to at most a directionality constraint when unconditionally released. When conditionality released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The memory and the one or more processors may be configured to communicate using one or more soft time resources, of the set of soft time resources, based at least in part on whether the set of soft time resources is conditionally released or unconditionally released.

In some aspects, a non-transitory computer-readable medium may store one or more instructions for wireless communication. The one or more instructions, when executed by one or more processors of a node in an IAB network, may cause the one or more processors to configure whether a set of soft time resources is to be conditionally released or unconditionally released. The set of soft time resources may be configurable in a schedulable state or a non-schedulable state. The set of soft time resources may be schedulable subject to at most a directionality constraint when unconditionally released. When conditionally released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The one or more instructions, when executed by one or more processors of a node in an IAB network, may cause the one or more processors to transmit a configuration that indicates whether the set of soft time resources is conditionally released or unconditionally released in the schedulable state.

In some aspects, a non-transitory computer-readable medium may store one or more instructions for wireless communication. The one or more instructions, when executed by one or more processors of a node in an IAB network, may cause the one or more processors to receive a configuration that indicates whether a set of soft time resources is conditionally released or unconditionally released in a schedulable state. The set of soft time resources may be configurable in the schedulable state or a non-schedulable state. The set of soft time resources may be schedulable subject to at most a directionality constraint when unconditionally released. When conditionality released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The one or more instructions, when executed by one or more processors of a node in an IAB network, may cause the one or more processors to communicate using one or more soft time resources, of the set of soft time resources, based at least in part on whether the set of soft time resources is conditionally released or unconditionally released.

In some aspects, an apparatus for wireless communication may include means for configuring whether a set of soft time resources is to be conditionally released or unconditionally released. The set of soft time resources may be configurable in a schedulable state or a non-schedulable state. The set of soft time resources may be schedulable subject to at most a directionality constraint when unconditionally released. When conditionally released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The apparatus may include means for transmitting a configuration that indicates whether the set of soft time resources is conditionally released or unconditionally released in the schedulable state.

In some aspects, an apparatus for wireless communication may include means for receiving a configuration that indicates whether a set of soft time resources is conditionally released or unconditionally released in a schedulable state. The set of soft time resources may be configurable in the schedulable state or a non-schedulable state. The set of soft time resources may be schedulable subject to at most a directionality constraint when unconditionally released. When conditionality released, the set of soft time resources may be schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint. The apparatus may include means for communicating using one or more soft time resources, of the set of soft time resources, based at least in part on whether the set of soft time resources is conditionally released or unconditionally released.

Aspects generally include a method, apparatus, system, device, computer program product, non-transitory computer-readable medium, user equipment, base station, wireless communication device, wireless node, node, controller node, parent node, child node, centralized unit, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes relating to conditional release of soft resources in an IAB network, in accordance with various aspects of the present disclosure.

DETAILED DESCRIPTION

Figure 1:
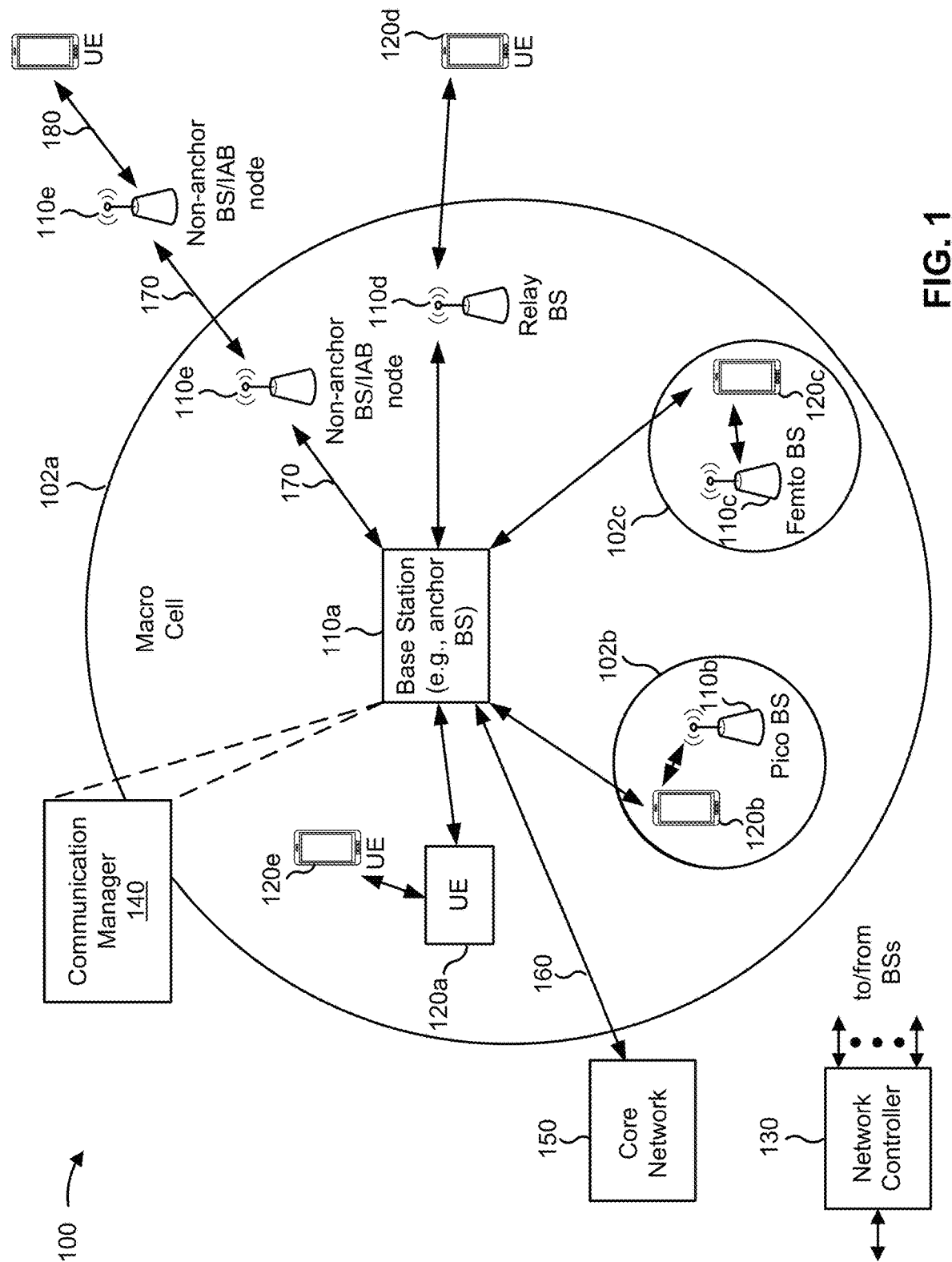
FIG. 1 is a block diagram conceptually illustrating an example of a wireless communication network, in accordance with various aspects of the present disclosure.

An IAB network may include a central unit and a plurality of IAB nodes. The central unit may perform configuration or other network functions for the plurality of IAB nodes. In some aspects, an IAB node may include an IAB donor, an anchor node, a non-anchor node, or a UE. A parent node (e.g., an IAB donor, an anchor node, or a non-anchor node) may have some control over resources of a child node (e.g., a non-anchor node or a UE) associated with the parent node. For example, a resource of the child node may be configurable by the parent node as schedulable by the child node or non-schedulable by the child node. Such a resource may be referred to as a soft resource of the child node. A child node may be associated with a parent node, meaning that that parent node can configure the child node's soft resources as schedulable or non-schedulable. A resource for which a release indication has been received from a parent node may be schedulable by the child node.

An IAB framework may permit time division multiplexing (TDM), where time resources are shared across and/or allocated to different nodes in the IAB network. This permits flexible scheduling, resource sharing, and efficient use of network resources throughout the IAB network. However, additional flexibility, resource sharing, and efficiencies may be achieved by permitting spatial division multiplexing (SDM) and/or frequency division multiplexing (FDM) in an IAB network, where spatial resources and/or frequency resources are shared across and/or allocated to different nodes in the IAB network. Some techniques and apparatuses described herein permit SDM and/or FDM in an IAB network, thereby improving spectral efficiency, increasing network flexibility, permitting additional resource sharing, and/or the like. In some aspects, such SDM and/or FDM may be achieved by enabling soft time resources to be conditionally released or unconditionally released. Additional details are described below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of B Ss 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may include a central unit (CU) that controls multiple base stations 110 and/or distributed units (DUs).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the base station 110 may include a communication manager 140. As described in more detail elsewhere herein, the communication manager 140 may determine whether a set of soft time resources is to be conditionally released or unconditionally released; transmit a configuration that indicates whether the set of soft time resources is conditionally released or unconditionally released in a schedulable state; and/or the like. Additionally, or alternatively, the communication manager 140 may receive a configuration that indicates whether a set of soft time resources is conditionally released or unconditionally released in a schedulable state; communicate using one or more soft time resources, of the set of soft time resources, based at least in part on whether the set of soft time resources is conditionally released or unconditionally released; and/or the like. Additionally, or alternatively, the communication manager 140 may perform one or more other operations described herein. Communication manager 140 may include one or more components of FIG. 2, as described below.

Similarly, the network controller 130 may include a communication manager 150. As described in more detail elsewhere herein, the communication manager 150 may determine whether a set of soft time resources is to be conditionally released or unconditionally released; transmit a configuration that indicates whether the set of soft time resources is conditionally released or unconditionally released in a schedulable state; and/or the like. Additionally, or alternatively, the communication manager 150 may perform one or more other operations described herein. Communication manager 150 may include one or more components of FIG. 2, as described below.

Base station 110 (e.g., base station 110a or another base station shown in FIG. 1) may connect to a core network 150 via a backhaul 160. For example, the backhaul 160 may be a fiber backhaul. Base station 110a is referred to as an anchor BS in the terminology of an integrated access and backhaul (IAB) network, since base station 110a provides a fiber connection to the core network 150. Base station 110a may communicate with one or more base stations 110e (shown as non-anchor BS/IAB node) via a wireless connection 170. A non-anchor BS is a base station that does not provide a fiber connection to the core network 160. In an IAB network, a series of non-anchor BSs may access the core network 150 via wireless connections 170 and via the backhaul 160. Some techniques and apparatuses described herein permit SDM and/or FDM in an IAB network such as the one shown in FIG. 1, thereby improving spectral efficiency, increasing network flexibility, permitting additional resource sharing, and/or the like. In some aspects, such SDM and/or FDM may be achieved by enabling soft time resources to be conditionally released or unconditionally released. Additional details are described below.

As indicated above, FIG. 1 is provided merely as an example. Other examples may differ from what was described with regard to FIG. 1.

Figure 2:
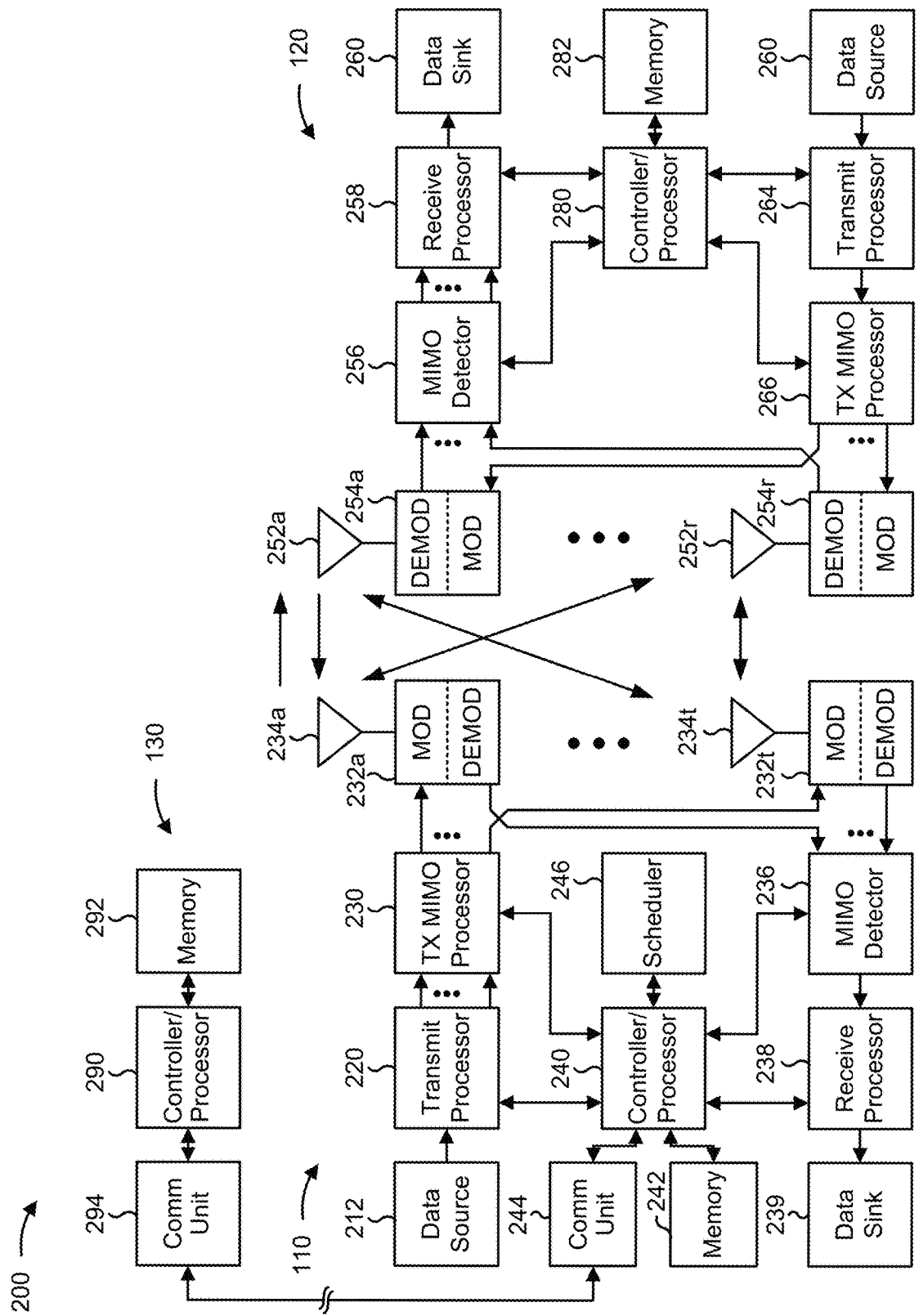
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with conditional release of soft resources in an IAB network, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, a node (e.g., a controller node, such as base station 110, network controller 130, and/or the like) may include means for configuring whether a set of soft time resources is to be conditionally released or unconditionally released, the set of soft time resources being configurable in a schedulable state or a non-schedulable state, and the set of soft time resources being schedulable subject to at most a directionality constraint when unconditionally released and, when conditionally released, being schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint; means for transmitting a configuration that indicates whether the set of soft time resources is conditionally released or unconditionally released in the schedulable state; and/or the like. In some aspects, such means may include one or more components of the base station 110 and/or the network controller 130 described in connection with FIG. 2.

In some aspects, a node (e.g., a wireless node, such as base station 110, UE 120, and/or the like) may include means for receiving a configuration that indicates whether a set of soft time resources is conditionally released or unconditionally released in a schedulable state, the set of soft time resources being configurable in the schedulable state or a non-schedulable state, and the set of soft time resources being schedulable subject to at most a directionality constraint when unconditionally released and, when conditionality released, being schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint; means for communicating using one or more soft time resources, of the set of soft time resources, based at least in part on whether the set of soft time resources is conditionally released or unconditionally released; and/or the like. In some aspects, such means may include one or more components of the base station 110 and/or the UE 120 described in connection with FIG. 2.

As indicated above, FIG. 2 is provided merely as an example. Other examples may differ from what was described with regard to FIG. 2.

Figure 3:
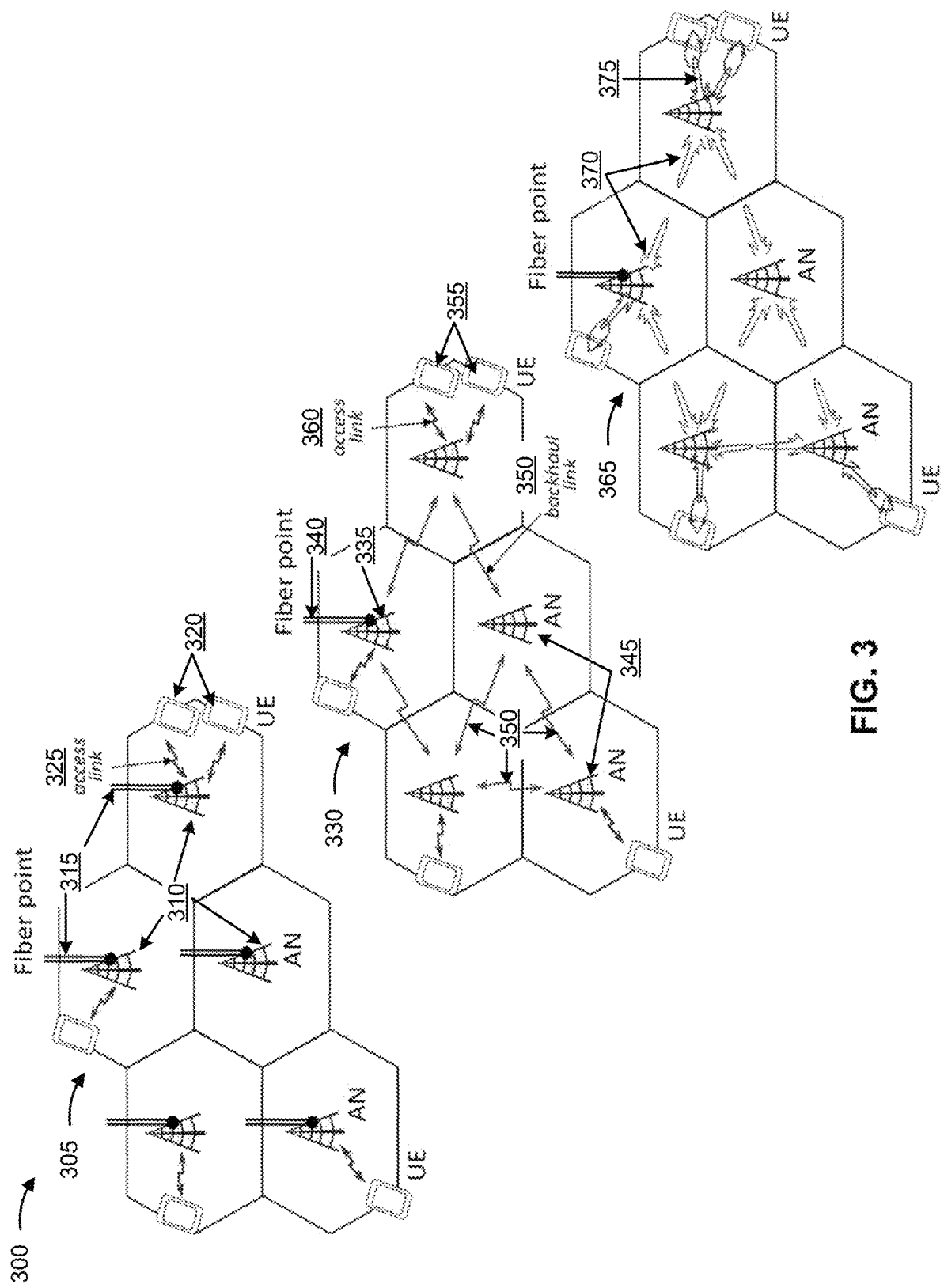
FIG. 3 is a diagram illustrating examples 300 of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples are possible and may differ from what was described with regard to FIG. 3.

Figure 4:
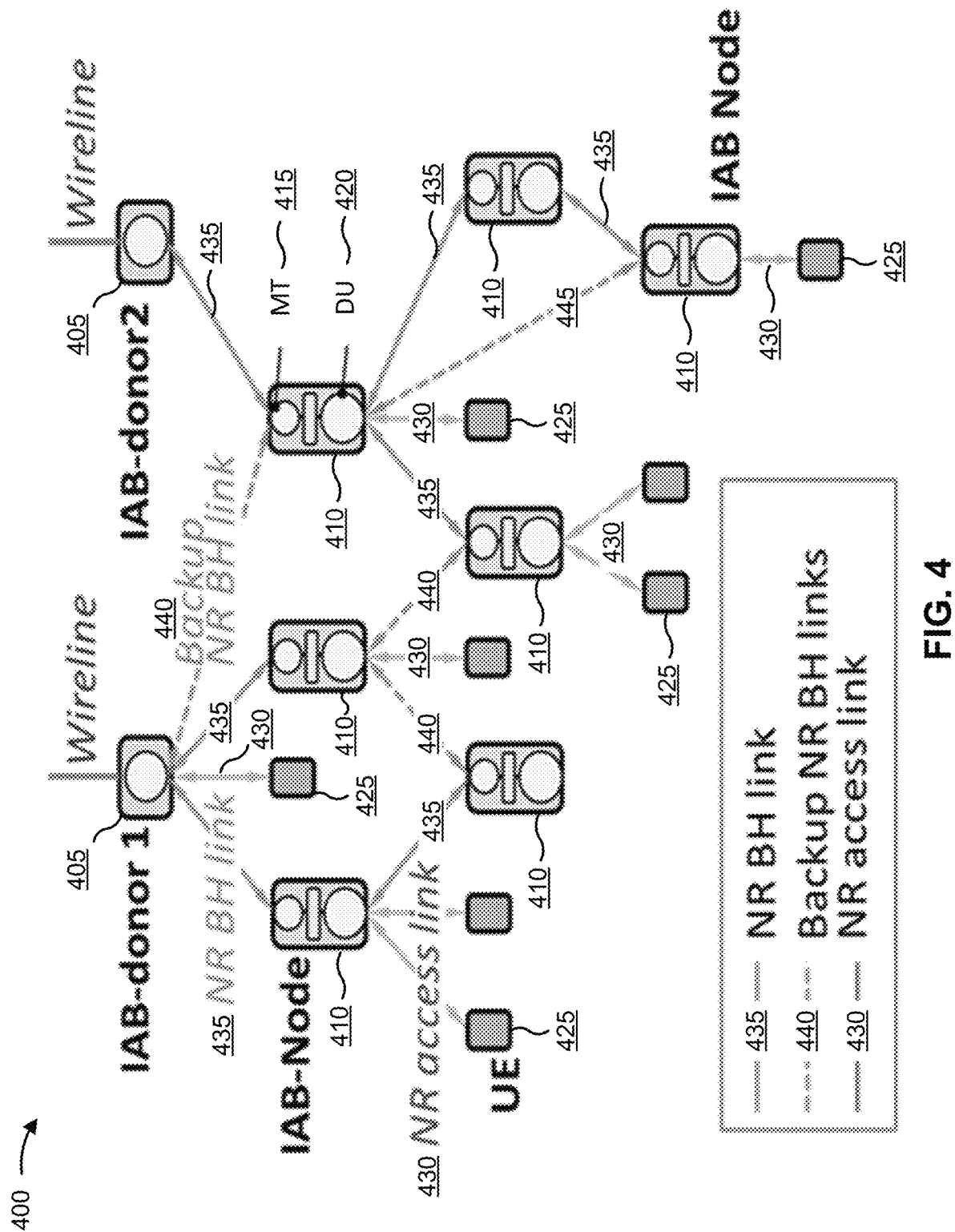
FIG. 4 is a diagram illustrating an example 400 of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (e.g., AMF). In some aspects, an anchor node 405 may include a base station 110, such as an anchor base station, as described above in connection with FIG. 3.

As further shown in FIG. 4, the IAB network may include non-anchor nodes 410, or IAB nodes (shown as IAB-Node). A non-anchor node 410 may provide integrated access and backhaul functionality, and may include mobile termination (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 440 may be used if a primary backhaul link fails, becomes congested, becomes overloaded, and/or the like.

As indicated above, FIG. 4 is provided as an example. Other examples are possible and may differ from what was described with regard to FIG. 4.

Figure 5:
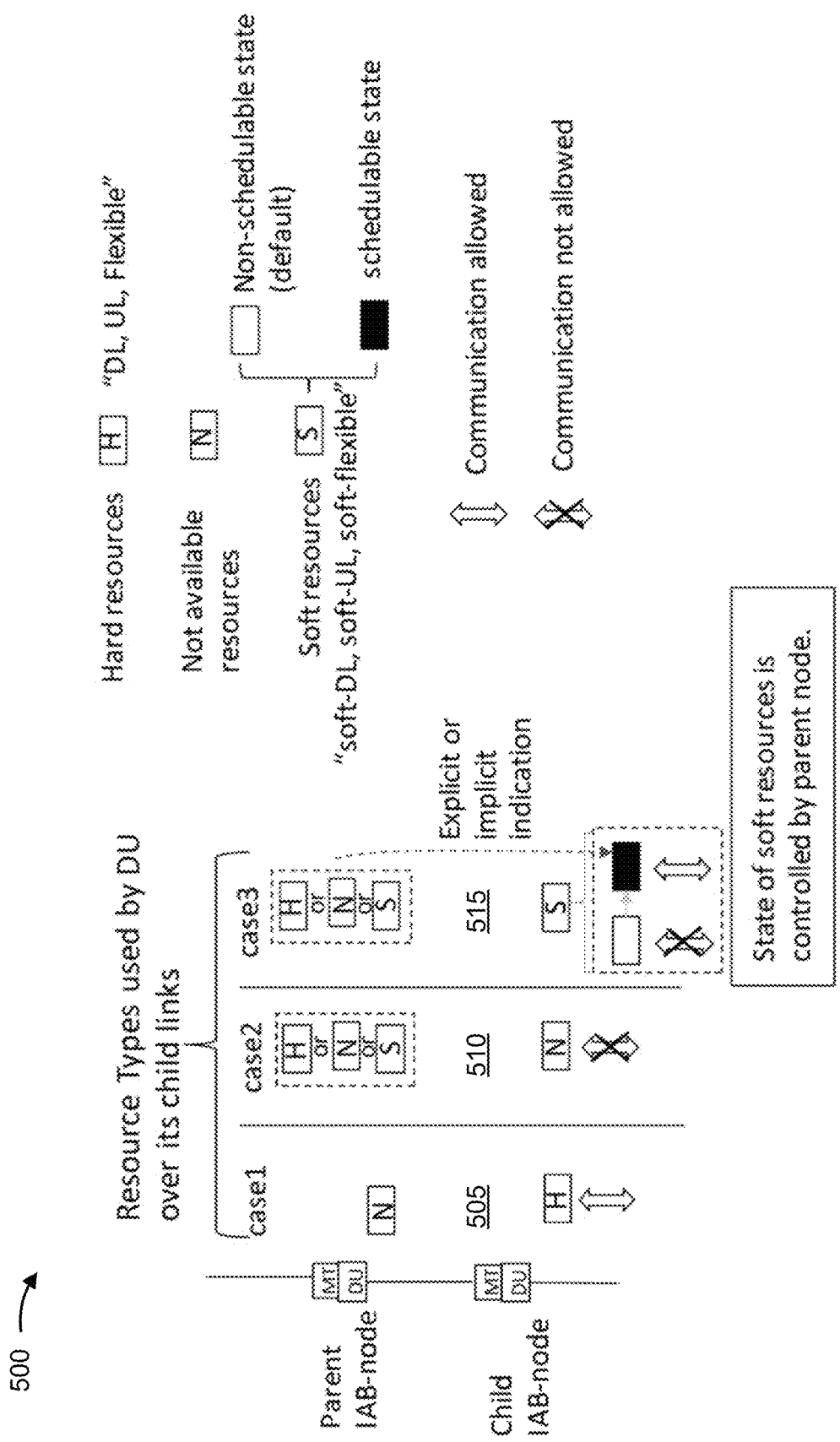
FIG. 5 is a diagram illustrating an example 500 of resource types in an IAB network, in accordance with various aspects of the disclosure.

FIG. 5 is a diagram illustrating an example 500 of resource types in an IAB network, in accordance with various aspects of the disclosure.

In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

The framework and resource types described above permit time division multiplexing (TDM), where time resources are shared across and/or allocated to different nodes in the IAB network. This permits flexible scheduling, resource sharing, and efficient use of network resources throughout the IAB network. However, additional flexibility, resource sharing, and efficiencies may be achieved by permitting spatial division multiplexing (SDM) and/or frequency division multiplexing (FDM) in an IAB network, where spatial resources and/or frequency resources are shared across and/or allocated to different nodes in the IAB network. Some techniques and apparatuses described herein permit SDM and/or FDM in an IAB network, thereby improving spectral efficiency, increasing network flexibility, permitting additional resource sharing, and/or the like. In some aspects, such SDM and/or FDM may be achieved by enabling soft time resources to be conditionally released or unconditionally released. Additional details are described below.

As indicated above, FIG. 5 is provided as an example. Other examples are possible and may differ from what was described with regard to FIG. 5.

Figure 6:
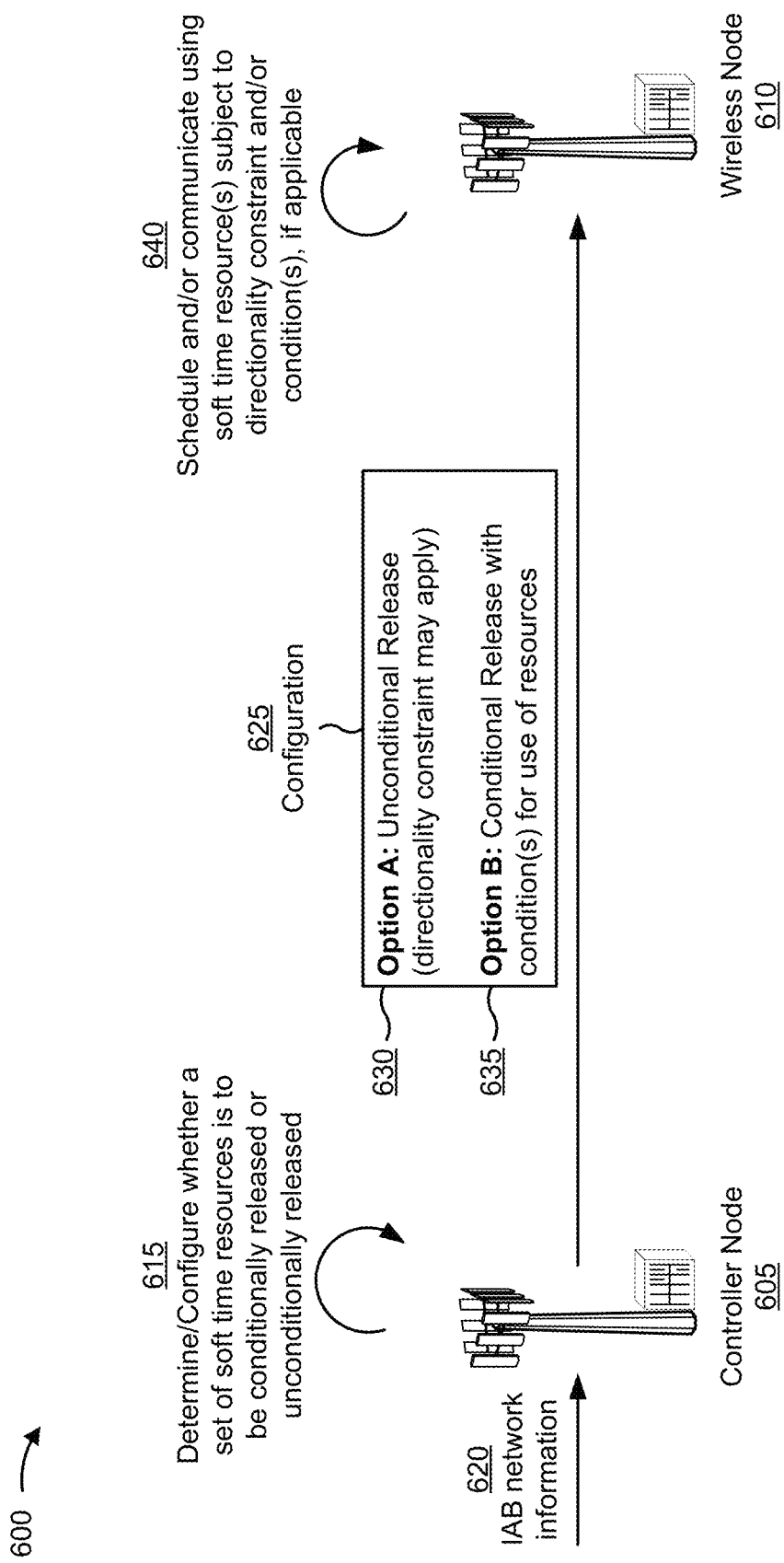
FIG. 6 is a diagram illustrating an example of conditional release of soft resources in an IAB network, in accordance with various aspects of the present disclosure.

FIG. 6 is a diagram illustrating an example 600 of conditional release of soft resources in an IAB network, in accordance with various aspects of the present disclosure.

As shown in FIG. 6, a controller node 605 and a wireless node 610 may communicate with one another in an IAB network. In some aspects, the controller node 605 and/or the wireless node 610 may include a base station 110 (e.g., an anchor base station, a non-anchor base station, an IAB donor, an IAB node, a centralized unit (CU) that controls multiple transmit receive points (TRPs) or distributed units (DUs) of one or more base stations 110, and/or the like). Additionally, or alternatively, the wireless node 610 may include a UE 120. In some aspects, the controller node 605 is a parent node and the wireless node 610 is a child node of the parent node. In this case, the controller node 605 (e.g., a DU function of the controller node 605) may schedule and/or control communications for the wireless node 610 (e.g., an MT function of the wireless node 610). Additionally, or alternatively, the controller node 605 may be a CU that schedules and/or controls communications for the wireless node 610 (e.g., an IAB donor controlled by the CU, a parent node, a child node, and/or the like). In some aspects, the CU may transmit information (e.g., a configuration) to a parent node, and the parent node may transmit the information to a child node (e.g., the wireless node 610).

As shown by reference number 615, the controller node 605 may determine whether a set of soft time resources is to be conditionally released or unconditionally released. In some aspects, unconditional release of a set of soft time resources by the controller node 605 means that the set of soft time resources are available to the wireless node 610 subject to at most a directionality constraint (e.g., meaning that the soft time resources may be subject to a directionality constraint or may not be subject to a directionality constraint, depending on a configuration of the soft time resources). A directionality constraint may include an uplink-only constraint or a downlink-only constraint, as described above in connection with FIG. 5.

For example, if the released soft time resources are configured as downlink-only time resources, then unconditional release of those resources makes those resources available to (e.g., schedulable by) the wireless node 610, provided that the wireless node 610 uses those resources only for downlink communications (e.g., subject to a downlink-only directionality constraint). Similarly, if the released soft time resources are configured as uplink-only time resources, then unconditional release of those resources makes those resources available to the wireless node 610, provided that the wireless node 610 uses those resources only for uplink communications (e.g., subject to an uplink-only directional constraint). However, if the released soft time resources are configured as flexible time resources, then unconditional release of those resources makes those resources available to the wireless node 610 without being subject to a directionality constraint because the wireless node 610 can use those resources for both uplink and downlink communications.

In some aspects, conditional release of a set of soft time resources by the controller node 605 means that the set of soft time resources are available to the wireless node 610 subject to one or more conditions other than a directionality constraint. For example, if the released soft time resources are configured with a directionality constraint (e.g., as downlink-only time resources or uplink-only time resources), then conditional release of those resources makes those resources available to the wireless node 610 subject to the directionality constraint and one or more conditions (e.g., one or more constraints) other than the directionality constraint.

In some aspects, if the released soft time resources are configured without a directionality constraint (e.g., as flexible time resources), then conditional release of those resources may make those resources available to the wireless node 610 without being subject to a directionality constraint, but subject to one or more conditions other than a directionality constraint. In some aspects, if the released soft time resources are configured without a directionality constraint (e.g., as flexible time resources), then conditional release of those resources may make those resources available to the wireless node 610 subject to a directionality constraint (e.g., as downlink-only time resources or uplink-only time resources). In this case, the conditional release my enforce one or more additional conditions, other than a directionality constraint.

As shown by reference number 620, in some aspects, the controller node 605 may determine and/or receive network information associated with the IAB network. In some aspects, the controller node 605 may use the network information to determine whether the set of soft time resources is to be conditionally released or unconditionally released. Additionally, or alternatively, if the set of soft time resources is to be conditionally released, the controller node 605 may use the network information to determine one or more conditions associated with the conditional release.

In some aspects, the network information may include capability information that indicates a capability of one or more nodes in the IAB network (e.g., one or more nodes associated with the set of soft time resources to be released, the controller node 605, the wireless node 610, and/or the like). For example, the network information may indicate a capability of a parent node (e.g., an IAB donor and/or the like) from which the set of soft time resources is to be released, a capability of a child node (e.g., an IAB node and/or the like) for which the set of soft time resources is to be released, a capability of the controller node 605, a capability of the wireless node 610, and/or the like.

In some aspects, the capability may indicate whether a node supports spatial division multiplexing (SDM), whether a node supports frequency division multiplexing (FDM), and/or the like. Because conditional release of resources may be used to support SDM and/or FDM, in some aspects, the controller node 605 may determine to conditionally release resources only if the parent node and/or the child node supports SDM and/or FDM.

Additionally, or alternatively, the capability may indicate whether a node supports the use of multiple timing references (e.g., different timing references and/or timing advance values for uplink communications versus downlink communications, for transmission versus reception, and/or the like). For example, if a condition relates to using adjusting and/or using multiple timing references for different communications (e.g., uplink versus downlink, transmission versus reception, and/or the like), and a child node does not support such a feature, then the controller node 605 may not include such a condition for conditional release of resources, may determine not to conditionally release resources (e.g., if the timing reference condition is the only condition), and/or the like.

Additionally, or alternatively, the network information may include topology information that indicates a topology of the IAB network. The network information may indicate, for example, a topology of the entire IAB network, a topology of a portion of the IAB network controlled by the controller node 605 and/or that includes the controller node 605, a topology of a portion of the IAB network that includes the wireless node 610, a topology of a portion of the IAB network that includes nodes capable of communicating with the parent node, a topology of portion of the IAB network that includes nodes capable of communicating with the child node, a topology of a portion of the IAB network that includes a number of hops from the parent node and/or the child node, and/or the like. Additionally, or alternatively, the topology information may indicate a hop level of one or more nodes (e.g., an IAB node, a child node, and/or the like), a number of hops in a sub-tree of the IAB network (e.g., a sub-tree that includes the controller node 605, the parent node, the child node, and/or the like), a number of child nodes (e.g., child IAB nodes) in the IAB network or a portion of the IAB network (e.g., a sub-tree), a number of parent nodes in the IAB network or a portion of the IAB network, a number of sibling nodes (e.g., child nodes that share the same parent node) in the IAB network or a portion of the IAB network, and/or the like.

In some aspects, the topology information may be used to determine and/or estimate a level of interference (e.g., inter-link interference and/or the like) among different nodes in the IAB network. In this case, the controller node 605 may determine whether the set of soft time resources is to be unconditionally released or conditionally released based at least in part on the level of interference. For example, the controller node 605 may unconditionally release the resources for lower levels of interference, or may conditionally release the resources for higher levels of interference. Additionally, or alternatively, the controller 605 may determine one or more conditions for a conditional release based at least in part on the level of interference (e.g., more conditions for higher interference, fewer conditions for lower interference, conditions designed to reduce interference, and/or the like).

Additionally, or alternatively, the network information may include traffic information associated with network traffic of the IAB network. For example, the traffic information may indicate a traffic demand (e.g., a level of network traffic) associated with the IAB network or a portion of the IAB network (e.g., a portion that includes the parent node, the child node, the controller node 605, the wireless node 610, and/or the like). In this case, the controller node 605 may determine whether the set of soft time resources is to be unconditionally released or conditionally released based at least in part on the traffic demand. For example, the controller node 605 may unconditionally release the resources for lower levels of traffic demand, or may conditionally release the resources for higher levels of traffic demand. Additionally, or alternatively, the controller 605 may determine one or more conditions for a conditional release based at least in part on the traffic demand (e.g., more conditions for higher traffic demand, fewer conditions for lower traffic demand, conditions designed to control the amount of traffic, and/or the like).

Additionally, or alternatively, the network information may indicate a resource utilization associated with one or more nodes of the IAB network (e.g., a parent node, a child node, controller node 605, wireless node 610, and/or the like). In this case, the controller node 605 may determine whether the set of soft time resources is to be unconditionally released or conditionally released based at least in part on the resource utilization. For example, the controller node 605 may unconditionally release the resources for lower levels of resource utilization, or may conditionally release the resources for higher levels of resource utilization. Additionally, or alternatively, the controller 605 may determine one or more conditions for a conditional release based at least in part on the resource utilization (e.g., more conditions for higher resource utilization, fewer conditions for lower resource utilization, conditions designed to control a resource utilization level, and/or the like).

In some aspects, the controller node 605 may request and/or receive network information from one or more nodes in the IAB network (e.g., a parent node, a child node, an IAB donor, an IAB node, the wireless node 610, and/or the like). For example, the network information may be reported to the controller node 605, such as in a capability report (e.g., for the capability information), and/or the like. Additionally, or alternatively, the controller node 605 may receive network information from a network controller 130.

As shown by reference number 625, the controller node 605 may transmit, and the wireless node 610 may receive, a configuration that indicates whether the set of soft time resources is conditionally released or unconditionally released. Additionally, or alternatively, if the set of soft time resources is conditionally released, the configuration may indicate one or more conditions associated with the conditional release (e.g., one or more conditions for scheduling and/or communicating using the set of soft time resources). As described above, the one or more conditions may include one or more conditions or constraints other than a directionality constraint, as described in more detail below.

In some aspects, when the controller node 605 is a CU, the configuration may be indicated to a parent node (e.g., an IAB donor, a DU function of the parent node, and/or the like) via an interface between the CU and the parent node (e.g., an F1-AP interface, a wired interface, and/or the like). Additionally, or alternatively, the configuration may be indicated in a radio resource control (RRC) message (e.g., an RRC configuration message, an RRC reconfiguration message, and/or the like). Additionally, or alternatively, the configuration may be indicated via another node (e.g., a parent node of the parent node). In some aspects, the other node may act as an intermediary node (e.g., between the CU and a parent node).

Additionally, or alternatively, when the controller node 605 is a CU, the configuration may be indicated to a child node (e.g., an IAB node, an MT function of the child node, and/or the like) via an interface between the CU and a DU function of the child node (e.g., which may then provide the configuration to an MT function of the child node). Additionally, or alternatively, the configuration may be indicated to the child node via a parent node of the child node (e.g., from the CU to a DU function of the parent node to the child node). Additionally, or alternatively, the configuration may be indicated to the child node via an RRC message, via downlink control information (DCI), via a media access control (MAC) control element (CE) (MAC-CE), via system information (e.g., a system information block (SIB) and/or the like), and/or the like.

In some aspects, when the controller node 605 is a parent node (e.g., a DU function of the parent node), the configuration may be indicated to a child node (e.g., an MT function of the child node) via an interface between the parent node and the child node (e.g., which may include an air interface). Additionally, or alternatively, the configuration may be indicated to the child node via an RRC message, DCI, and/or the like.

In some aspects, a single message may be used to indicate the configuration. In some aspects, multiple messages may be used to indicate the configuration. For example, an RRC message and DCI may be used to indicate the configuration. In this case, the RRC message may indicate a set of configurations (e.g., unconditional release, conditional release, and/or sets of different conditions for the conditional release), and the DCI may be used to indicate which configuration is to be selected from the set of configurations.

As shown by reference number 630, in some aspects, the configuration may indicate that the set of soft time resources is unconditionally released. In this case, the wireless node 610 may use the set of soft time resources (e.g., for scheduling communications, for communicating, and/or the like) without being subject to one or more conditions, other than a directionality constraint, for using the set of soft time resources, as described above.

As shown by reference number 635, in some aspects, the configuration may indicate that the set of soft time resources is conditionally released. In some aspects, if the configuration indicates that the set of soft time resources is conditionally released, the configuration may indicate one or more conditions of the conditional release. In this case, the wireless node 610 may use the set of soft time resources (e.g., for scheduling communications, for communicating, and/or the like) subject to the one or more conditions. Thus, if the wireless node 610 uses the set of soft time resources (or a portion thereof), the wireless node 610 may be required to communicate, in those resources, using a configuration that satisfies the one or more conditions. As indicated above, the one or more conditions may be conditions other than a directionality constraint.

In some aspects, a condition (e.g., of the one or more conditions) may include a timing reference constraint for using the set of soft time resources. The timing reference constraint may indicate that the wireless node 610 is only permitted to communicate using the set of soft time resources if such communications comply with a timing reference (e.g., which may be indicated in the configuration) . The timing reference may be used to synchronize timing of communications (e.g., using a timing advance value and/or the like) across two or more nodes in the IAB network. For example, the timing reference may be used to synchronize timing of communications along two adjacent hops in the IAB network (e.g., between a parent node of the wireless node 610, the wireless node 610, and a child node of the wireless node 610), such as to permit SDM and/or FDM over two adjacent hops. In some aspects, the wireless node 610 may adjust a transmission timing and/or a reception timing (e.g., for the conditionally released resources) to comply with the timing reference constraint.

Additionally, or alternatively, a condition may include a power constraint for using the set of soft time resources, such as a transmit power constraint or a receive power constraint. The power constraint may indicate, for example, a maximum power for communications in the set of soft time resources (e.g., a maximum transmit power, a maximum receive power, and/or the like). In some aspects, the wireless node 610 may adjust a transmit power or a receive power when transmitting or receiving communications via the conditionally released resources to comply with the power constraint. This may reduce and/or control inter-link interference, may permit power sharing for multiple concurrent communications (e.g., transmit power sharing for multiple transmissions) for SDM and/or FDM, and/or the like.

Additionally, or alternatively, a condition may include a reference signal (RS) pattern constraint for using the set of soft time resources. The RS pattern constraint may indicate an RS pattern (or a set of RS patterns, from which the wireless node 610 may select an RS pattern) to be used when communicating via the set of soft resources. An RS pattern may indicate a set of resource blocks (RBs) to be used for reference signals (e.g., demodulation reference signals (DMRS), phase tracking reference signals (PTRS), and/or the like), one or more antenna ports to be used to transmit or receive reference signals, and/or the like. In some aspects, the wireless node 610 may configure transmission or monitoring of reference signals, according to the RS pattern, when communicating via the conditionally released resources to comply with the RS pattern constraint. This may enable multi-user multiple-input multiple-output (MU-MIMO) operations (e.g., over adjacent hops), may provide reference signals for interference measurement and/or interference mitigation, and/or the like.

Additionally, or alternatively, a condition may include a spatial resource constraint for using the set of soft time resources. The spatial resource constraint may indicate a set of spatial resources permitted to be used when communicating using the set of soft time resources, and/or may indicate a set of spatial resources not permitted to be used when communicating using the set of soft time resources. A set of spatial resources may be indicated, for example, using a set of transmission configuration indicator (TCI) states (e.g., in a TCI table), a set of quasi co-location (QCL) parameters, a set of spatial domain filters, a set of spatial relations, and/or the like. In some aspects, the wireless node 610 may configure communications in the spatial domain, when communicating via the conditionally released resources, to comply with the spatial resource constraint. This may provide spatial separation between concurrent communications of different nodes, thereby reducing interference, improving network performance, permitting SDM, and/or the like.

Additionally, or alternatively, a condition may include a frequency resource constraint for using the set of soft time resources. The frequency resource constraint may indicate a set of frequency resources permitted to be used when communicating using the set of soft time resources, and/or may indicate a set of frequency resources not permitted to be used when communicating using the set of soft time resources. A set of frequency resources may be indicated, for example, as a set of RBs, a set of frequency bands, a set of frequency sub-bands, a set of bandwidth parts (BWPs), and/or the like. In some aspects, the wireless node 610 may configure communications in the frequency domain, when communicating via the conditionally released resources, to comply with the frequency resource constraint. This may provide frequency separation between concurrent communications of different nodes, thereby reducing interference, improving network performance, permitting FDM, and/or the like.

Additionally, or alternatively, a condition may include a modulation and coding scheme (MCS) constraint for using the set of soft time resources. In some aspects, the MCS constraint may be explicitly indicated. In some aspects, the MCS constraint may be implicitly indicated, and/or may be determined by the wireless node 610 based at least in part on one or more other constraints, such as a power constraint, an RS pattern constraint, a frequency resource constraint, and/or the like. The MCS constraint may indicate a set of MCS permitted to be used when communicating using the set of soft time resources, and/or may indicate a set of MCS not permitted to be used when communicating using the set of soft time resources. In some aspects, the wireless node 610 may configure an MCS for communications, when communicating via the conditionally released resources, to comply with the MCS constraint. This may permit the wireless node 610 to comply with one or more other constraints.

Additionally, or alternatively, a condition may include a constraint on a type of signal permitted to be transmitted or received using the set of soft time resources (e.g., a data signal, a control signal, a reference signal, and/or the like). Additionally, or alternatively, a condition may include a constraint on a type of channel permitted to be used to communicate using the set of soft time resources (e.g., a data channel, a control channel, and/or the like). For example, the condition may indicate one or more permitted signal types, one or more signal types that are not permitted, one or more permitted channel types, one or more channel types that are not permitted, and/or the like. In some aspects, these constraint(s) may be explicitly indicated. In some aspects, these constraint(s) may be implicitly indicated, and/or may be determined by the wireless node 610 based at least in part on one or more other constraints, such as a spatial resource constraint, a power constraint (e.g., for one or more spatial resources), and/or the like. For example, certain spatial resource constraints may dictate whether beams are available for a control channel (e.g., for control signals), for a data channel (e.g., for data signals), for certain types of reference signals (e.g., beam-sweeping reference signals), and/or the like.

As shown by reference number 640, the wireless node 610 may use (e.g., schedule and/or communicate using) one or more resources, of the set of soft resources, based at least in part on the configuration, as described above. For example, the wireless node 610 may use the one or more resources subject to at most the directionality constraint (e.g., if applicable to the set of soft time resources) when the configuration indicates that the set of soft time resources is to be unconditionally released. Alternatively, the wireless node 610 may use the one or more resources subject to one or more conditions of conditional release when the configuration indicates that the set of soft time resources is to be conditionally released.

In some aspects, the configuration may be a system-wide configuration (e.g., when the controller node 605 is a CU). In this case, the configuration may apply to all wireless nodes controlled by the controller node 605. For example, the controller node 605 may indicate the configuration to all of the wireless nodes controlled by the controller node. In this way, complexity may be reduced by adopting the same configuration system-wide.

In some aspects, the configuration may be a local configuration. In this case, the controller node 605 may indicate different configurations to different wireless nodes and/or different sets of wireless nodes. Additionally, or alternatively, different controller nodes 605 may indicate different configurations to respective wireless nodes controlled by those controller nodes 605. In this case, different portions of the IAB network may adopt different configurations, thereby increasing flexibility in resource configuration.

In some aspects, the configuration may be specific to a set of soft time resources. In this case, different sets of soft time resources may be associated with different configurations (e.g., unconditional release versus conditional release, different sets of conditions for conditional release, and/or the like). In this case, the configuration may indicate a set of soft time resources to which a configuration applies. In this way, the flexibility of resource configurations may be increased.

In some aspects, the configuration may apply across multiple sets of (e.g., all) soft time resources. In this case, the configuration may be indicated a single time (e.g., for a time period, until the configuration is changed, and/or the like), and may be applied to different sets of soft time resources when those sets of soft time resources are released (e.g., which may occur at different times). In this way, network resources associated with indicating the configuration may be conserved.

In some aspects, the configuration may be specific to a time period, and/or may change over time. For example, a first configuration for a set of soft time resources may be indicated at a first time, and may be applied to communications that use the set of soft time resources. At a second time (e.g., a later time), the configuration may change (e.g., due to a change in network information), and a second configuration for the set of soft time resources may be indicated. In this way, the set of soft resources may be flexibly configured. In some aspects, the configuration may be changed using activation signaling and/or deactivation signaling, such as to change an operating mode between conditional release and unconditional release. Additionally, or alternatively, the configuration may be changed by indicating one or more conditions that have changed (e.g., that have been added, removed, or modified), by indicating a new set of conditions, and/or the like.

By permitting conditional release of soft time resources, SDM and/or FDM may be enabled for an IAB network. Additionally, or alternatively, a parent node may subject the soft time resources to one or more conditions so that the parent node can continue to use the soft time resources for communications (e.g., with one or more child nodes), while permitting a child node to communicate using those soft time resources subject to the one or more conditions, thereby improving spectral efficiency. Furthermore, the conditional release of soft time resources may assist with controlling interference (e.g., inter-link interference), as described elsewhere herein.

As indicated above, FIG. 6 is provided as an example. Other examples may differ from what was described with respect to FIG. 6.

Figure 7:
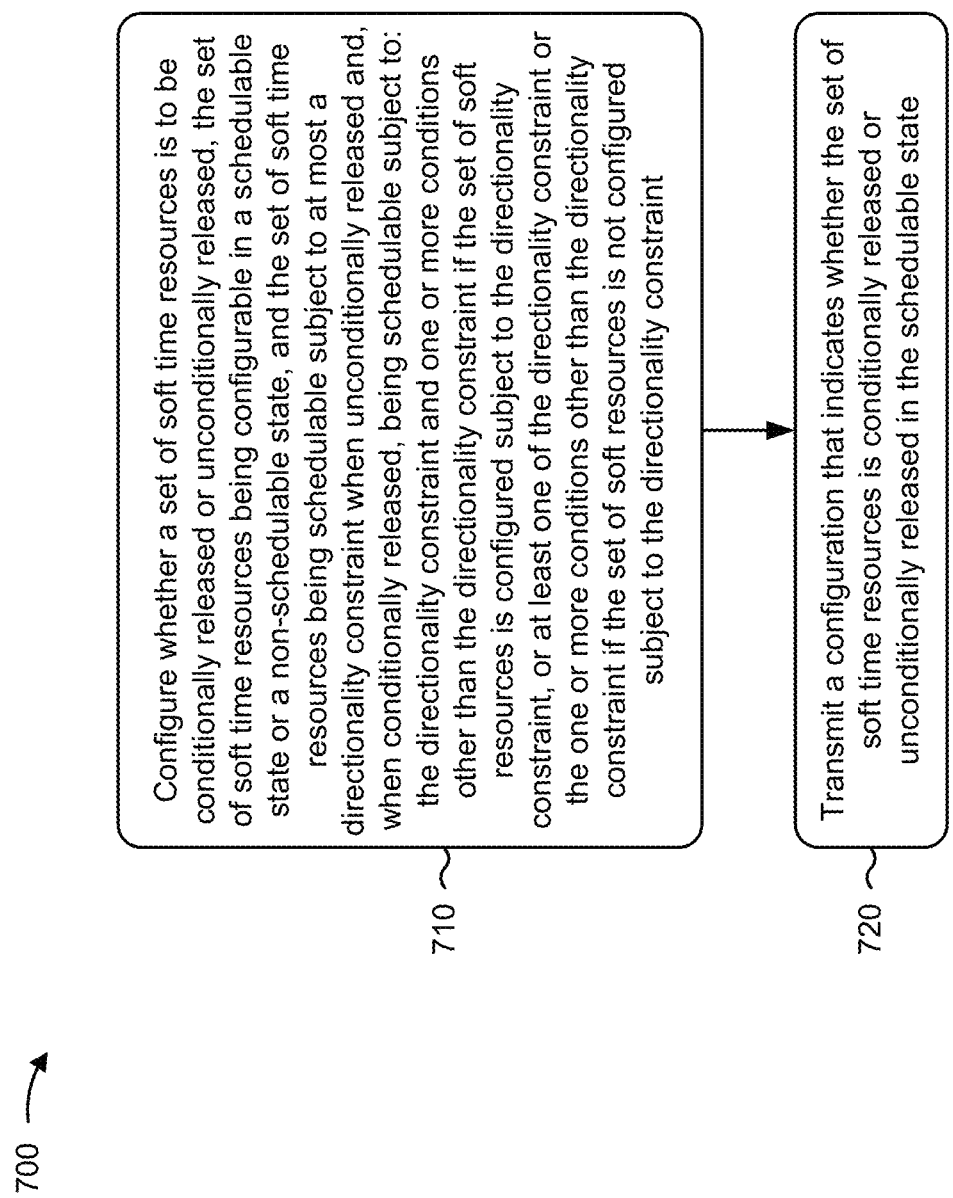

FIG. 7 is a diagram illustrating an example process 700 performed, for example, by a node, in accordance with various aspects of the present disclosure. Example process 700 is an example where the node (e.g., controller node 605, base station 110, an IAB donor, a parent node, and/or the like) performs operations relating to conditional release of soft resources in an IAB network.

As shown in FIG. 7, in some aspects, process 700 may include configuring whether a set of soft time resources is to be conditionally released or unconditionally released, the set of soft time resources being configurable in a schedulable state or a non-schedulable state, and the set of soft time resources being schedulable subject to at most a directionality constraint when unconditionally released and, when conditionally released, being schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint (block 710). For example, the node (e.g., using controller/processor 240, memory 242, controller/processor 290, memory 292, and/or the like) may determine or configure whether a set of soft time resources is to be conditionally released or unconditionally released, as described above. In some aspects, the set of soft time resources are configurable in a schedulable state or a non-schedulable state. In some aspects, the set of soft time resources are schedulable subject to at most a directionality constraint when unconditionally released and, when conditionally released, are schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint.

As further shown in FIG. 7, in some aspects, process 700 may include transmitting a configuration that indicates whether the set of soft time resources is conditionally released or unconditionally released in the schedulable state (block 720). For example, the node (e.g., using controller/processor 240, transmit processor 220, TX MIMO processor 230, MOD 232, antenna 234, controller/processor 290, communication unit 294, and/or the like) may transmit a configuration that indicates whether the set of soft time resources is conditionally released or unconditionally released in the schedulable state, as described above.

Process 700 may include additional aspects, such as any single aspect or any combination of aspects described below and/or in connection with one or more other processes described elsewhere herein.

In a first aspect, the configuration indicates the one or more conditions when the configuration indicates that the set of soft time resources is to be conditionally released.

In a second aspect, alone or in combination with the first aspect, the one or more conditions include at least one of: a timing reference constraint for one or more communications scheduled using one or more resources of the set of soft time resources, a transmit power constraint for the one or more communications, a receive power constraint for the one or more communications, a reference signal pattern constraint for the one or more communications, a spatial resource constraint for the one or more communications, a frequency resource constraint for the one or more communications, a modulation and coding scheme (MCS) constraint for the one or more communications, a constraint on a type of signal permitted for the one or more communications, a constraint on a type of channel permitted to be used to transmit the one or more communications, or a combination thereof.

In a third aspect, alone or in combination with one or more of the first and second aspects, the node is a centralized unit (CU) or a parent node in the IAB network.

In a fourth aspect, alone or in combination with one or more of the first through third aspects, at least one of the configuration of whether the set of soft time resources is to be conditionally released or unconditionally released or a determination of the one or more conditions is based at least in part on at least one of: a capability of a parent node from which the set of soft time resources is to be released, a capability of a child node for which the set of soft time resources is to be released, a topology associated with the IAB network, the parent node, or the child node, a traffic demand associated with the IAB network, the parent node, or the child node, a resource utilization of the parent node or the child node, or a combination thereof.

In a fifth aspect, alone or in combination with one or more of the first through fourth aspects, the configuration is indicated via at least one of: an interface between a centralized unit and a parent node of the IAB network, an interface between the parent node and a child node of the parent node, a radio resource control message, downlink control information, a media access control (MAC) control element, a system information block, or a combination thereof.

In a sixth aspect, alone or in combination with one or more of the first through fifth aspects, the configuration applies to all wireless nodes controlled by the node.

In a seventh aspect, alone or in combination with one or more of the first through sixth aspects, the configuration is different from another configuration used in a different part of the IAB network.

In an eighth aspect, alone or in combination with one or more of the first through seventh aspects, the configuration is specific to the set of soft time resources.

In a ninth aspect, alone or in combination with one or more of the first through eighth aspects, the configuration is specific to a time period.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a node, in accordance with various aspects of the present disclosure. Example process 800 is an example where the node (e.g., wireless node 610, base station 110, UE 120, an IAB donor, and/or the like) performs operations relating to conditional release of soft resources in an IAB network.

As shown in FIG. 8, in some aspects, process 800 may include receiving a configuration that indicates whether a set of soft time resources is conditionally released or unconditionally released in a schedulable state, the set of soft time resources being configurable in the schedulable state or a non-schedulable state, and the set of soft time resources being schedulable subject to at most a directionality constraint when unconditionally released and, when conditionality released, being schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint (block 810). For example, the node (e.g., using antenna 234, DEMOD 232, MIMO detector 236, receive processor 238, controller/processor 240, and/or the like) may receive a configuration that indicates whether a set of soft time resources is conditionally released or unconditionally released in a schedulable state, as described above. In some aspects, the set of soft time resources are configurable in a schedulable state or a non-schedulable state. In some aspects, the set of soft time resources are schedulable subject to at most a directionality constraint when unconditionally released and, when conditionally released, are schedulable subject to: the directionality constraint and one or more conditions other than the directionality constraint if the set of soft resources is configured subject to the directionality constraint, or at least one of the directionality constraint or the one or more conditions other than the directionality constraint if the set of soft resources is not configured subject to the directionality constraint.

As further shown in FIG. 8, in some aspects, process 800 may include communicating using one or more soft time resources, of the set of soft time resources, based at least in part on whether the set of soft time resources is conditionally released or unconditionally released (block 820). For example, the node (e.g., using controller/processor 240, transmit processor 220, TX MIMO processor 230, MOD 232, antenna 234, DEMOD 232, MIMO detector 236, receive processor 238, and/or the like) may communicate using one or more soft time resources, of the set of soft time resources, based at least in part on whether the set of soft time resources is conditionally released or unconditionally released, as described above.

Process 800 may include additional aspects, such as any single aspect or any combination of aspects described below and/or in connection with one or more other processes described elsewhere herein.

In a first aspect, communicating using the one or more soft time resources comprises communicating using the one or more soft time resources subject to at most the directionality constraint when the configuration indicates that the set of soft time resources is to be unconditionally released.

In a second aspect, alone or in combination with the first aspect, communicating using the one or more soft time resources comprises communicating using the one or more soft time resources subject to the directionality constraint and the one or more conditions other than the directionality constraint when the configuration indicates that the set of soft time resources is to be conditionally released and when the set of soft resources is configured subject to the directionality constraint.

In a third aspect, alone or in combination with one or more of the first and second aspects, communicating using the one or more soft time resources comprises communicating using the one or more soft time resources subject to at least one of the directionality constraint or the one or more conditions other than the directionality constraint when the configuration indicates that the set of soft time resources is to be conditionally released and when the set of soft resources is not configured subject to the directionality constraint.

In a fourth aspect, alone or in combination with one or more of the first through third aspects, the configuration indicates the one or more conditions when the configuration indicates that the set of soft time resources is to be conditionally released.

In a fifth aspect, alone or in combination with one or more of the first through fourth aspects, the one or more conditions include at least one of: a timing reference constraint for one or more communications scheduled using the one or more soft time resources, a transmit power constraint for the one or more communications, a receive power constraint for the one or more communications, a reference signal pattern constraint for the one or more communications, a spatial resource constraint for the one or more communications, a frequency resource constraint for the one or more communications, a modulation and coding scheme (MCS) constraint for the one or more communications, a constraint on a type of signal permitted for the one or more communications, a constraint on a type of channel permitted to be used to transmit the one or more communications, or a combination thereof.

In a sixth aspect, alone or in combination with one or more of the first through fifth aspects, the node is a child node in the IAB network.

In a seventh aspect, alone or in combination with one or more of the first through sixth aspects, the configuration is indicated via at least one of: an interface between a parent node and the node, a radio resource control message, downlink control information, a media access control (MAC) control element, a system information block, or a combination thereof.

In an eighth aspect, alone or in combination with one or more of the first through seventh aspects, the configuration is specific to the set of soft time resources.

In a ninth aspect, alone or in combination with one or more of the first through eighth aspects, the configuration is specific to a time period.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node in an integrated access and backhaul (IAB) network, comprising:
   configuring whether a set of soft time resources is to be conditionally released or unconditionally released,
   the set of soft time resources being configurable in a schedulable state or a non-schedulable state, and
   the set of soft time resources being schedulable subject to at most a directionality constraint when unconditionally released and, when conditionally released, being schedulable subject to:
      the directionality constraint and one or more conditions other than the directionality constraint if the set of soft time resources is configured subject to the directionality constraint, or
      at least one of the directionality constraint or the one or more conditions other than the directionality constraint if the set of soft time resources is not configured subject to the directionality constraint; and
   transmitting a configuration that indicates whether the set of soft time resources is conditionally released or unconditionally released in the schedulable state.

2. The method of claim 1, wherein the configuration indicates the one or more conditions when the configuration indicates that the set of soft time resources is to be conditionally released.

3. The method of claim 1, wherein the one or more conditions include at least one of:
   a timing reference constraint for one or more communications scheduled using one or more resources of the set of soft time resources,
   a transmit power constraint for the one or more communications,
   a receive power constraint for the one or more communications,
   a reference signal pattern constraint for the one or more communications,
   a spatial resource constraint for the one or more communications,
   a frequency resource constraint for the one or more communications,
   a modulation and coding scheme (MCS) constraint for the one or more communications,
   a constraint on a type of signal permitted for the one or more communications,
   a constraint on a type of channel permitted to be used to transmit the one or more communications, or
   a combination thereof.

4. The method of claim 1, wherein the node is a centralized unit (CU) in the IAB network.

5. The method of claim 1, wherein at least one of the configuration of whether the set of soft time resources is to be conditionally released or unconditionally released or a determination of the one or more conditions is based at least in part on at least one of:
   a capability of a parent node from which the set of soft time resources is to be released,
   a capability of a child node for which the set of soft time resources is to be released,
   a topology associated with the IAB network, the parent node, or the child node,
   a traffic demand associated with the IAB network, the parent node, or the child node,
   a resource utilization of the parent node or the child node, or
   a combination thereof.

6. The method of claim 1, wherein the configuration is indicated via at least one of:
   an interface between a centralized unit and a parent node of the IAB network,
   an interface between the parent node and a child node of the parent node,
   a radio resource control message,
   downlink control information,
   a media access control (MAC) control element,
   a system information block, or
   a combination thereof.

7. The method of claim 1, wherein the configuration applies to all wireless nodes controlled by the node.

8. The method of claim 1, wherein the configuration is different from another configuration used in a different part of the IAB network.

9. The method of claim 1, wherein the configuration is specific to the set of soft time resources.

10. The method of claim 1, wherein the configuration is specific to a time period.

11. A method of wireless communication performed by a node in an integrated access and backhaul (IAB) network, comprising:
    receiving a configuration that indicates whether a set of soft time resources is conditionally released or unconditionally released in a schedulable state,
    the set of soft time resources being configurable in the schedulable state or a non- schedulable state, and
    the set of soft time resources being schedulable subject to at most a directionality constraint when unconditionally released and, when conditionality released, being schedulable subject to:
       the directionality constraint and one or more conditions other than the directionality constraint if the set of soft time resources is configured subject to the directionality constraint, or
       at least one of the directionality constraint or the one or more conditions other than the directionality constraint if the set of soft time resources is not configured subject to the directionality constraint; and
    communicating using one or more soft time resources, of the set of soft time resources, based at least in part on whether the set of soft time resources is conditionally released or unconditionally released.

12. The method of claim 11, wherein communicating using the one or more soft time resources comprises communicating using the one or more soft time resources subject to at most the directionality constraint when the configuration indicates that the set of soft time resources is to be unconditionally released.

13. The method of claim 11, wherein communicating using the one or more soft time resources comprises communicating using the one or more soft time resources subject to the directionality constraint and the one or more conditions other than the directionality constraint when the configuration indicates that the set of soft time resources is to be conditionally released and when the set of soft time resources is configured subject to the directionality constraint.

14. The method of claim 11, wherein communicating using the one or more soft time resources comprises communicating using the one or more soft time resources subject to at least one of the directionality constraint or the one or more conditions other than the directionality constraint when the configuration indicates that the set of soft time resources is to be conditionally released and when the set of soft time resources is not configured subject to the directionality constraint.

15. The method of claim 11, wherein the configuration indicates the one or more conditions when the configuration indicates that the set of soft time resources is to be conditionally released.

16. The method of claim 11, wherein the one or more conditions include at least one of:
   a timing reference constraint for one or more communications scheduled using the one or more soft time resources,
   a transmit power constraint for the one or more communications,
   a receive power constraint for the one or more communications,
   a reference signal pattern constraint for the one or more communications,
   a spatial resource constraint for the one or more communications,
   a frequency resource constraint for the one or more communications,
   a modulation and coding scheme (MCS) constraint for the one or more communications,
   a constraint on a type of signal permitted for the one or more communications,
   a constraint on a type of channel permitted to be used to transmit the one or more communications, or
   a combination thereof.

17. The method of claim 11, wherein the node is a child node in the IAB network.

18. The method of claim 11, wherein the configuration is indicated via at least one of:
   an interface between a parent node and the node,
   a radio resource control message,
   downlink control information,
   a media access control (MAC) control element,
   a system information block, or
   a combination thereof.

19. The method of claim 11, wherein the configuration is specific to the set of soft time resources.

20. The method of claim 11, wherein the configuration is specific to a time period.

21. A node in an integrated access and backhaul (IAB) network, comprising:
   memory; and
   one or more processors coupled to the memory, the memory and the one or more processors configured to:
      configure whether a set of soft time resources is to be conditionally released or unconditionally released, the set of soft time resources being configurable in a schedulable state or a non- schedulable state, and the set of soft time resources being schedulable subject to at most a directionality constraint when unconditionally released and, when conditionally released, being schedulable subject to:
         the directionality constraint and one or more conditions other than the directionality constraint if the set of soft time resources is configured subject to the directionality constraint, or
         at least one of the directionality constraint or the one or more conditions other than the directionality constraint if the set of soft time resources is not configured subject to the directionality constraint; and
      transmit a configuration that indicates whether the set of soft time resources is conditionally released or unconditionally released in the schedulable state.

22. The node of claim 21, wherein the one or more conditions include at least one of:
   a timing reference constraint for one or more communications scheduled using one or more resources of the set of soft time resources,
   a transmit power constraint for the one or more communications,
   a receive power constraint for the one or more communications,
   a reference signal pattern constraint for the one or more communications,
   a spatial resource constraint for the one or more communications,
   a frequency resource constraint for the one or more communications,
   a modulation and coding scheme (MCS) constraint for the one or more communications,
   a constraint on a type of signal permitted for the one or more communications,
   a constraint on a type of channel permitted to be used to transmit the one or more communications, or
   a combination thereof.

23. The node of claim 21, wherein the node is a centralized unit (CU) or a parent node in the IAB network.

24. The node of claim 21, wherein at least one of the configuration of whether the set of soft time resources is to be conditionally released or unconditionally released or a determination of the one or more conditions is based at least in part on at least one of:
   a capability of a parent node from which the set of soft time resources is to be released,
   a capability of a child node for which the set of soft time resources is to be released,
   a topology associated with the IAB network, the parent node, or the child node,
   a traffic demand associated with the IAB network, the parent node, or the child node,
   a resource utilization of the parent node or the child node, or
   a combination thereof.

25. The node of claim 21, wherein the configuration is indicated via at least one of:
   an interface between a centralized unit and a parent node of the IAB network,
   an interface between the parent node and a child node of the parent node,
   a radio resource control message,
   downlink control information,
   a media access control (MAC) control element,
   a system information block, or
   a combination thereof.

26. A node in an integrated access and backhaul (IAB) network, comprising:

memory; and
one or more processors coupled to the memory, the memory and the one or more processors configured to:
receive a configuration that indicates whether a set of soft time resources is conditionally released or unconditionally released in a schedulable state,
the set of soft time resources being configurable in the schedulable state or a non-schedulable state, and
the set of soft time resources being schedulable subject to at most a directionality constraint when unconditionally released and, when conditionality released, being schedulable subject to:
the directionality constraint and one or more conditions other than the directionality constraint if the set of soft time resources is configured subject to the directionality constraint, or
at least one of the directionality constraint or the one or more conditions other than the directionality constraint if the set of soft time resources is not configured subject to the directionality constraint; and
communicate using one or more soft time resources, of the set of soft time resources, based at least in part on whether the set of soft time resources is conditionally released or unconditionally released.

27. The node of claim 26, wherein the node, when communicating using the one or more soft time resources, is configured to communicate using the one or more soft time resources subject to at most the directionality constraint when the configuration indicates that the set of soft time resources is to be unconditionally released.

28. The node of claim 26, wherein the node, when communicating using the one or more soft time resources, is configured to communicate using the one or more soft time resources subject to the directionality constraint and the one or more conditions other than the directionality constraint when the configuration indicates that the set of soft time resources is to be conditionally released and when the set of soft time resources is configured subject to the directionality constraint.

29. The node of claim 26, wherein the node, when communicating using the one or more soft time resources, is configured to communicate using the one or more soft time resources subject to at least one of the directionality constraint or the one or more conditions other than the directionality constraint when the configuration indicates that the set of soft time resources is to be conditionally released and when the set of soft time resources is not configured subject to the directionality constraint.

30. The node of claim 26, wherein the one or more conditions include at least one of:
a timing reference constraint for one or more communications scheduled using the one or more soft time resources,
a transmit power constraint for the one or more communications,
a receive power constraint for the one or more communications,
a reference signal pattern constraint for the one or more communications,
a spatial resource constraint for the one or more communications,
a frequency resource constraint for the one or more communications,
a modulation and coding scheme (MCS) constraint for the one or more communications,
a constraint on a type of signal permitted for the one or more communications,
a constraint on a type of channel permitted to be used to transmit the one or more communications, or
a combination thereof.

31. The method of claim 2, wherein the set of soft time resources configured to be conditionally released to the wireless node is available to the wireless node subject to the one or more conditions.

32. The method of claim 15, wherein the set of soft time resources to be conditionally released to the node is available to the node subject to the one or more conditions.

33. A node in an integrated access and backhaul (IAB) network, comprising:
memory; and
one or more processors coupled to the memory, the memory and the one or more processors configured to:
configure a set of soft time resources to be conditionally released to a wireless node,
the set of soft time resources being configurable in a schedulable state or a non- schedulable state, and
the set of soft time resources, being schedulable subject to:
a directionality constraint and one or more conditions other than the directionality constraint when the set of soft time resources is configured subject to the directionality constraint, or
the one or more conditions other than the directionality constraint if the set of soft time resources is not configured subject to the directionality constraint; and
transmit a configuration that indicates the set of soft time resources is conditionally released in the schedulable state.

34. The node of claim 33, wherein the configuration indicates the one or more conditions when the configuration indicates that the set of soft time resources is to be conditionally released.

35. The node of claim 34, wherein the set of soft time resources configured to be conditionally released to the wireless node is available to the wireless node subject to the one or more conditions.

36. The node of claim 33, wherein the one or more conditions include at least one of:
a timing reference constraint for one or more communications scheduled using one or more resources of the set of soft time resources,
a transmit power constraint for the one or more communications,
a spatial resource constraint for the one or more communications,
a frequency resource constraint for the one or more communications, or
a combination thereof.

37. The node of claim 33, wherein the one or more conditions include at least one of:
a receive power constraint for the one or more communications,
a reference signal pattern constraint for the one or more communications,
a modulation and coding scheme (MCS) constraint for the one or more communications,
a constraint on a type of channel permitted to be used to transmit the one or more communications, or
a combination thereof.

38. A node in an integrated access and backhaul (IAB) network, comprising:

means for configuring whether a set of soft time resources is to be conditionally released or unconditionally released, the set of soft time resources being configurable in a schedulable state or a non- schedulable state, and the set of soft time resources being schedulable subject to at most a directionality constraint when unconditionally released and, when conditionally released, being schedulable subject to:
- the directionality constraint and one or more conditions other than the directionality constraint if the set of soft time resources is configured subject to the directionality constraint, or
- at least one of the directionality constraint or the one or more conditions other than the directionality constraint if the set of soft time resources is not configured subject to the directionality constraint; and means for transmitting a configuration that indicates whether the set of soft time resources is conditionally released or unconditionally released in the schedulable state.

39. The node of claim 38, wherein the configuration indicates the one or more conditions when the configuration indicates that the set of soft time resources is to be conditionally released.

40. The node of claim 38, wherein the one or more conditions include at least one of:
- a timing reference constraint for one or more communications scheduled using one or more resources of the set of soft time resources,
- a transmit power constraint for the one or more communications,
- a receive power constraint for the one or more communications,
- a reference signal pattern constraint for the one or more communications,
- a spatial resource constraint for the one or more communications,
- a frequency resource constraint for the one or more communications,
- a modulation and coding scheme (MCS) constraint for the one or more communications,
- a constraint on a type of signal permitted for the one or more communications,
- a constraint on a type of channel permitted to be used to transmit the one or more communications, or
- a combination thereof.

41. The node of claim 38, wherein the node is a centralized unit (CU) in the IAB network.

42. The node of claim 38, wherein at least one of the configuration of whether the set of soft time resources is to be conditionally released or unconditionally released or a determination of the one or more conditions is based at least in part on at least one of:
- a capability of a parent node from which the set of soft time resources is to be released,
- a capability of a child node for which the set of soft time resources is to be released,
- a topology associated with the IAB network, the parent node, or the child node,
- a traffic demand associated with the IAB network, the parent node, or the child node,
- a resource utilization of the parent node or the child node, or
- a combination thereof.

43. The node of claim 38, wherein the configuration is indicated via at least one of:
- an interface between a centralized unit and a parent node of the IAB network,
- an interface between the parent node and a child node of the parent node,
- a radio resource control message,
- downlink control information,
- a media access control (MAC) control element,
- a system information block, or
- a combination thereof.

44. A node in an integrated access and backhaul (IAB) network, comprising:

means for receiving a configuration that indicates whether a set of soft time resources is conditionally released or unconditionally released in a schedulable state, the set of soft time resources being configurable in the schedulable state or a non- schedulable state, and the set of soft time resources being schedulable subject to at most a directionality constraint when unconditionally released and, when conditionality released, being schedulable subject to:
- the directionality constraint and one or more conditions other than the directionality constraint if the set of soft time resources is configured subject to the directionality constraint, or at least one of the directionality constraint or the one or more conditions other than the directionality constraint if the set of soft time resources is not configured subject to the directionality constraint; and means for communicating using one or more soft time resources, of the set of soft time resources, based at least in part on whether the set of soft time resources is conditionally released or unconditionally released.

45. The node of claim 44, wherein the means for communicating using the one or more soft time resources comprises means for communicating using the one or more soft time resources subject to at most the directionality constraint when the configuration indicates that the set of soft time resources is to be unconditionally released.

46. The node of claim 44, wherein the means for communicating using the one or more soft time resources comprises means for communicating using the one or more soft time resources subject to the directionality constraint and the one or more conditions other than the directionality constraint when the configuration indicates that the set of soft time resources is to be conditionally released and when the set of soft time resources is configured subject to the directionality constraint.

47. The node of claim 44, wherein the means for communicating using the one or more soft time resources comprises means for communicating using the one or more soft time resources subject to at least one of the directionality constraint or the one or more conditions other than the directionality constraint when the configuration indicates that the set of soft time resources is to be conditionally released and when the set of soft time resources is not configured subject to the directionality constraint.

48. The node of claim 44, wherein the one or more conditions include at least one of:
- a timing reference constraint for one or more communications scheduled using the one or more soft time resources,
- a transmit power constraint for the one or more communications,
- a receive power constraint for the one or more communications,
- a reference signal pattern constraint for the one or more communications, a spatial resource constraint for the one or more communications, a frequency resource constraint for the one or more communications, a modulation and coding scheme (MCS) constraint for the one or more communications, a constraint on a type of signal permitted for the one or more communications, a constraint on a type of channel permitted to be used to transmit the one or more communications, or a combination thereof.

49. The node of claim 44, wherein the node is a child node in the IAB network.

50. A non-transitory computer-readable medium storing a set of instructions for wireless communication, the set of instructions comprising:
one or more instructions that, when executed by one or more processors of a node in an integrated access and backhaul (IAB) network, cause the node to:
configure whether a set of soft time resources is to be conditionally released or unconditionally released,
the set of soft time resources being configurable in a schedulable state or a non- schedulable state, and
the set of soft time resources being schedulable subject to at most a directionality constraint when unconditionally released and, when conditionally released, being schedulable subject to:
the directionality constraint and one or more conditions other than the directionality constraint if the set of soft time resources is configured subject to the directionality constraint, or
at least one of the directionality constraint or the one or more conditions other than the directionality constraint if the set of soft time resources is not configured subject to the directionality constraint; and
transmit a configuration that indicates whether the set of soft time resources is conditionally released or unconditionally released in the schedulable state.

51. The non-transitory computer-readable medium of claim 50, wherein the one or more conditions include at least one of:
a timing reference constraint for one or more communications scheduled using one or more resources of the set of soft time resources, a transmit power constraint for the one or more communications, a receive power constraint for the one or more communications, a reference signal pattern constraint for the one or more communications, a spatial resource constraint for the one or more communications, a frequency resource constraint for the one or more communications, a modulation and coding scheme (MCS) constraint for the one or more communications, a constraint on a type of signal permitted for the one or more communications, a constraint on a type of channel permitted to be used to transmit the one or more communications, or a combination thereof.

52. A non-transitory computer-readable medium storing a set of instructions for wireless communication, the set of instructions comprising:
one or more instructions that, when executed by one or more processors of a node in an integrated access and backhaul (IAB) network, cause the node to
receive a configuration that indicates whether a set of soft time resources is conditionally released or unconditionally released in a schedulable state,
the set of soft time resources being configurable in the schedulable state or a non-schedulable state, and
the set of soft time resources being schedulable subject to at most a directionality constraint when unconditionally released and, when conditionality released, being schedulable subject to:
the directionality constraint and one or more conditions other than the directionality constraint if the set of soft time resources is configured subject to the directionality constraint, or
at least one of the directionality constraint or the one or more conditions other than the directionality constraint if the set of soft time resources is not configured subject to the directionality constraint; and communicate using one or more soft time resources, of the set of soft time resources, based at least in part on whether the set of soft time resources is conditionally released or unconditionally released.

* * * * *